Figure 1:
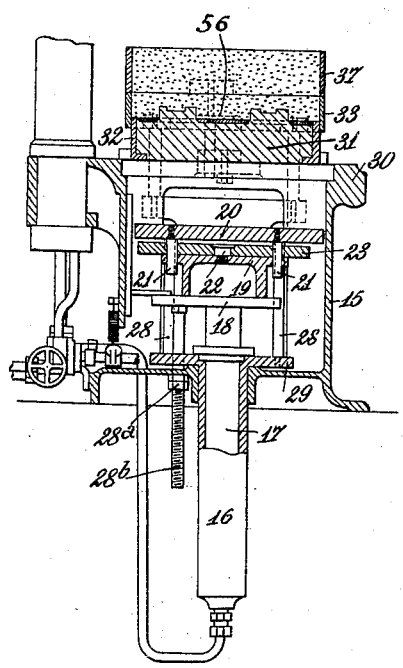

E. RONCERAY.
MOLDING MACHINE.
APPLICATION FILED JULY 25, 1910.

976,833.

Patented Nov. 22, 1910.
4 SHEETS—SHEET 1.

Fig. 5ᵃ

Witnesses.

Inventor.
Eugene Ronceray
by Atty
Paul Synnestvedt

E. RONCERAY.
MOLDING MACHINE.
APPLICATION FILED JULY 25, 1910.

976,833.

Patented Nov. 22, 1910.
4 SHEETS—SHEET 2.

Inventor.
Eugene Ronceray
by atty
Paul Synnestvedt

E. RONCERAY.
MOLDING MACHINE.
APPLICATION FILED JULY 25, 1910.

976,833.

Patented Nov. 22, 1910.
4 SHEETS—SHEET 3.

Witnesses

Inventor.
Eugene Ronceray
by atty
Paul Synnestvedt

E. RONCERAY.
MOLDING MACHINE.
APPLICATION FILED JULY 25, 1910.

976,833.

Patented Nov. 22, 1910.
4 SHEETS—SHEET 4.

UNITED STATES PATENT OFFICE.

EUGENE RONCERAY, OF PARIS, FRANCE, ASSIGNOR TO SOCIETE ANONYME DES ETABLISSEMENTS PH. BONVILLIAN & E. RONCERAY, OF PARIS, FRANCE, A CORPORATION OF FRANCE.

MOLDING-MACHINE.

976,833.  Specification of Letters Patent.  Patented Nov. 22, 1910.

Application filed July 25, 1910. Serial No. 573,702.

*To all whom it may concern:*

Be it known that I, EUGENE RONCERAY, a citizen of France, residing at Paris, France, have invented certain new and useful Improvements in Molding-Machines, of which the following is a specification.

Figure 2:
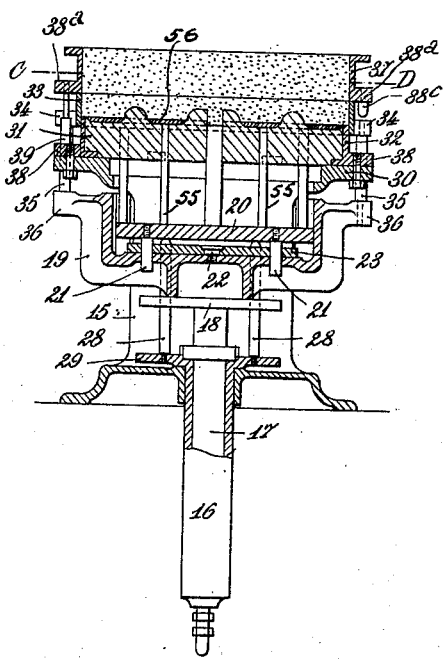
Figure 2:
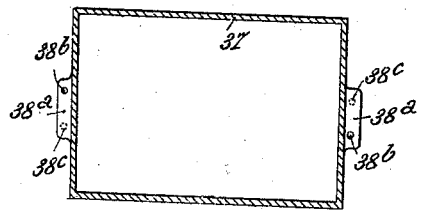
Figure 5:
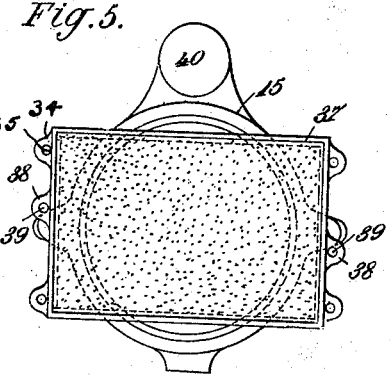
Figure 3:
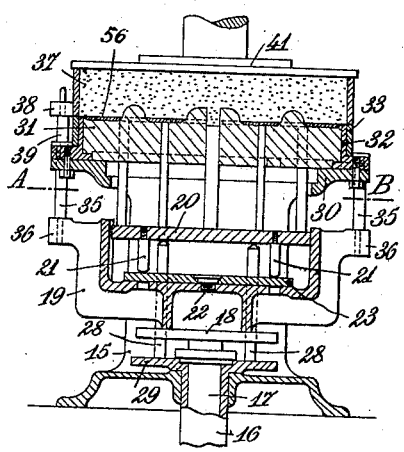
Figure 4:
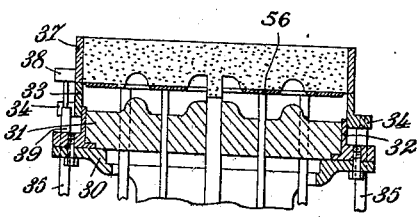
Figure 7:
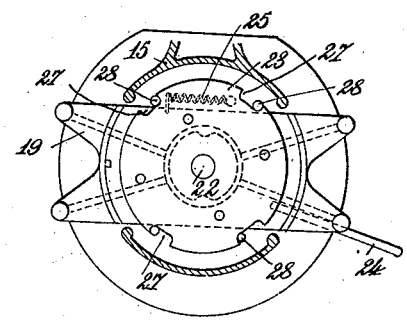
Figure 6:
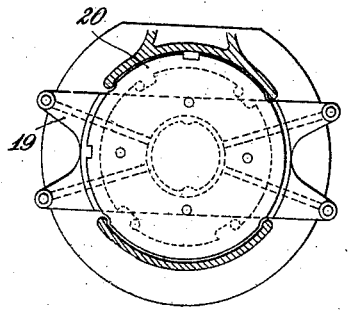
Figure 8:
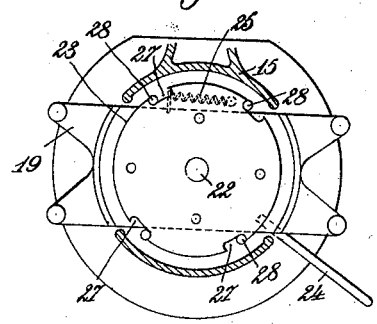
Figure 9:
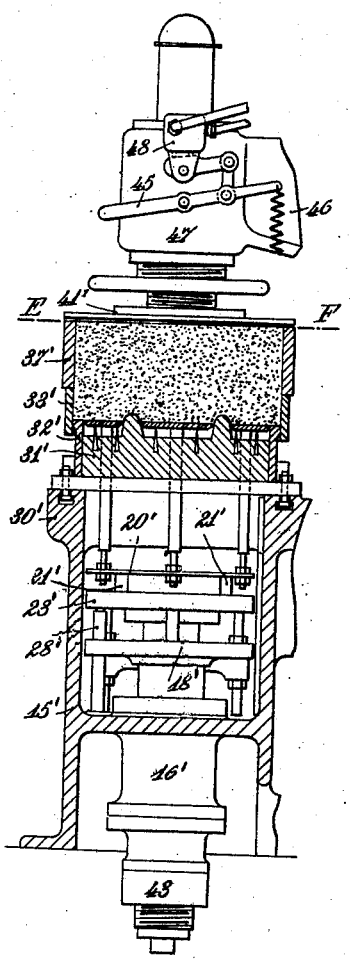
Figure 12:
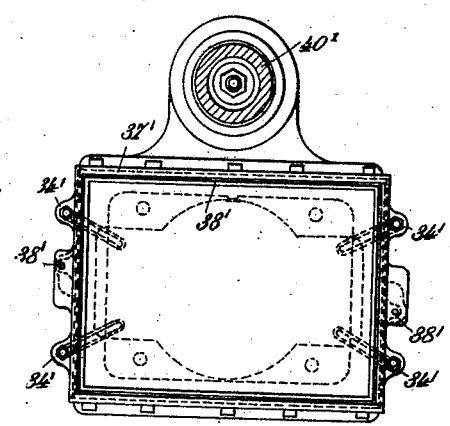
Figure 13:
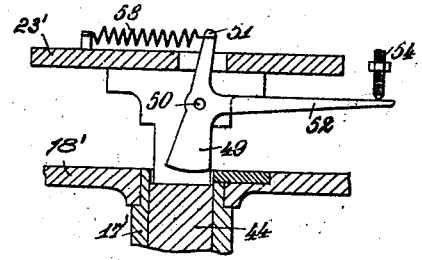
Figure 10:
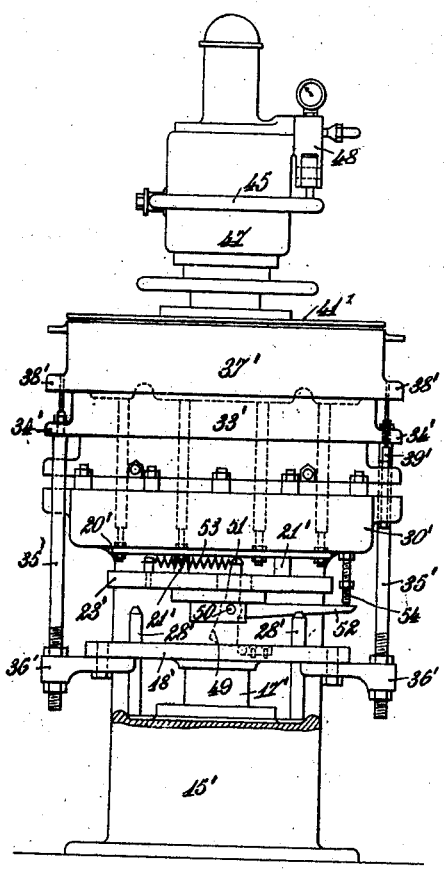
Figure 11:
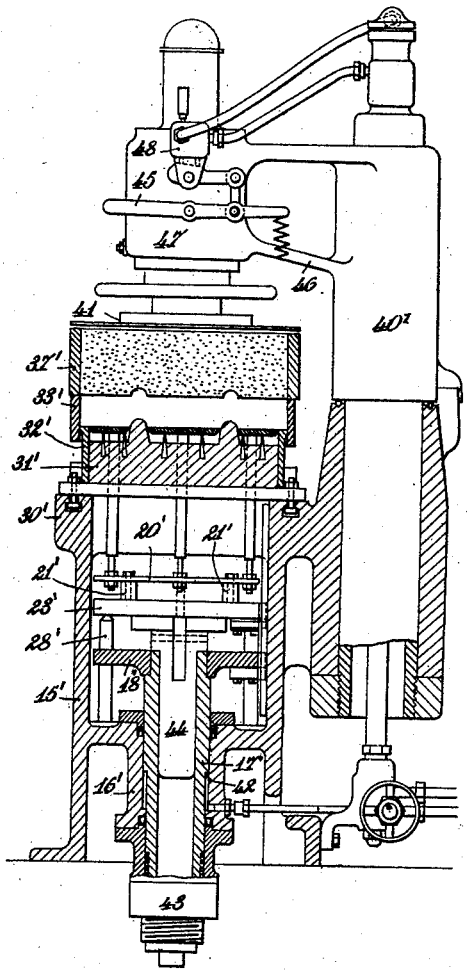

The invention relates to molding machines, and has for its primary objects; the provision of a machine in which the ramming and pattern drawing may be accomplished more rapidly than has been heretofore done; the provision of a molding machine in which the use of the usual loose sand frame is dispensed with and in which the sand frame employed remains in convenient position and ready for use after each drawing operation; the provision of a machine in which the ramming plate moves with the mold in the drawing operation, so that a certain amount of suction is exerted by such plate upon the upper face of the sand, which suction tends to prevent the central portions of the mold from the sagging which often occurs with the ordinary apparatus where the ramming plate is withdrawn from the upper face of the mold and the mold lifted by the corners of the flask in the usual way; and the provision of a machine in which the operations throughout are substantially automatic and require only a slight amount of attention by the operator. Certain embodiments of the invention are shown in the accompanying drawings, wherein:

Figure 1 is a vertical section through the molding machine before molding; Figure 2 is a vertical section through the machine on a plane at a right angle to that of Figure 1; Figure 3 is a vertical section showing the molding machine after ramming the sand; Figure 4 is a partial vertical section of the machine during pattern drawing; Figure 5 is a plan view of the machine with the flask 37 removed; Figure 5ª is a horizontal section through the flask on the line C—D of Figure 2; Figure 6 is a horizontal section on the line A—B of Figure 3; Figure 7 is also a horizontal section on the line A—B, but with the plate 20 and parts carried thereby, removed; Figure 8 is similar to Figure 7, but shows one of the elements in another position; Figure 9 is an elevation partially sectional of a modified design of the molding machine shown in Figures 1–8, at the beginning of the ramming operation; Figure 10 is a front view of the same machine after pattern drawing; Figure 11 is an elevation partially sectional after pattern drawing; Figure 12 is a horizontal section on line E—F of Figure 9, and Figure 13 is a detail view of an automatic lock mechanism.

The machine shown in Figures 1 to 8 comprises a frame 15 in the vertical axis of which is fixed a hydraulic cylinder 16 in which the pattern drawing piston 17 is adapted to reciprocate. On the top of this piston is bolted the plate 18, on which is bolted an internally bored part 19, in which is located another plate 20, guided to move vertically. Under this plate 20 are fixed several rods 21 of a given length passing through holes drilled in the bottom of the part 19. In the center of the part 19 is pivoted a disk 23 resting on the part 19 and of course below the table 20. This disk can be moved by a lever 24 and returns under the influence of a spring 25. When the lever is pulled by the operator, the holes are opposite the rods 21, and the plate 20 can fall down. On the other hand, this plate 20 is stopped in its downward motion by vertical rods 28 bolted on the plate 29 which is fixed on the frame 15 of the machine.

The upper part of the frame 15 constitutes a table 30 on which the pattern plate 31 is fixed, the framework 32 of such plate being provided with lugs 38 carrying the flask guide pins 39.

The sand frame 33 slides outside the frame 32 and is provided about its angles with projections 34 fixed on vertical rods 35 which are themselves bolted to projections 36 cast in one with the part 19. The flask 37 is placed on the sand frame 33 and is fitted with two projections 38ª drilled with holes 38ᵇ for registering with the guide pins 39 and with the usual match pins 38ᶜ.

On the frame 15 is fixed a vertical column 40 on which a horizontal beam, in which the ramming cylinder is bolted, is adapted to swing. This arrangement, which is well known, is not shown on the drawing and Figure 3 shows only the ramming plate 41 bolted to the lower end of the ramming piston.

On the plate 20 are fixed the stools and lifting rods, *i. e.*, the various rods 55 to lift stripping plates 56, cores, etc., as in other molding machines. The pattern drawing piston is always under pressure and consequently holds in its upper position the part 19 with the sand frame and also the flask. The upper position is determined by a stop nut 28ª screwed on the rod 28ᵇ fixed under the plate 18 and passing through the frame 15 against which the nut 28ª engages. The ramming plate is fixed at the convenient height, so that it comes approximately to the level of the upper face of flask 37.

For ramming, the cross-beam being put aside, the flask is placed above the sand frame and is filled with sand. The ramming plate is then swung in position above the flask and at the same time throws off the excess of sand. Pressure being applied in the cylinder, the ramming plate 41 pushes down the flask 37, sand frame 33, part 19, pattern drawing piston 17, and the disk 23 moves down with the part 19, but the plate 20, being supported by rods 28, remains in position (Figure 3). The sand frame 33 moves down until it comes against stops specially provided for the purpose, so that when down, its upper edge is at the level of the upper edge of the frame of the pattern plate. At this time, the disk 23 has arrived at the level of the lower ends of the rods 21, which have remained in position, and then the spring 25 causes the disk 23 to turn to an angle sufficient to bring opposite rods 21 and corresponding parts of disk 23. The ramming is finished and drawing of the pattern is proceeded with. To effect this, the ramming valve is put to exhaust and the ramming plate is lifted at the same time as the pattern drawing piston, part 19, sand frame 33 and flask 37, the disk 23 raising up the plate 20 through the rods 21, and of course at the same time raising the stools, lifting rods, stripping plate, cores, etc., (Figure 4). When the pattern has been drawn, the flask is taken out. At the same time the sand frame 33 has moved into a convenient position for the next operation of ramming. The operator has not had to attend to the sand frame, and its manipulation and the sand ramming and pattern drawing have been effected with great rapidity, the only operation being the filling of the flask with sand and the reciprocation of the rams. Before proceeding to a fresh operation, the lever 24 is pulled so as to bring the disk 23 opposite the rods 21, so that plate 20 falls down on the rods 28 with its equipment of lifting rods, stools, stripping plate, etc., and these parts again take up their position for the next ramming operation.

In the modified design shown in Figures 9 to 13 the principle of the machine is the same as above, but all operations are effected automatically, except the operation of the valve, this modification being made especially in view of very rapid operation. In this construction, the pattern drawing piston 17′ is hollow and has two different diameters, the upper part being somewhat larger than the lower part, so that an annular part 42 is formed on which the pressure for pattern drawing acts—the lower part of this piston 17′ is screwed to receive a nut 43 used as the stop and which limits the upper position of movement. This nut can be regulated according to different cases. The upper part of this piston 17′ bears the plate 18′, having a projection 36′ adapted to receive vertical rods 35′ on which the sand frame 33′ is bolted, through the projections 34′. The inside of the piston 17′ is bored to act as a guide for another piston 44 on the top of which the disk 23′ is bolted. On this disk is bolted through the parts 21′, a plate 20′ on which are fixed somewhat more yieldingly than before the lifting rods, stools, etc., supporting the stripping plate and cores, if any. The disk or plate 23′ bears on the frame of the machine through vertical rods 28′ fixed in this frame. The whole is governed by a lever 45 pivoted on the bracket 46 with which the ramming cylinder 47 is connected. In this cylinder moves the piston to the bottom of which the ramming plate 41 is attached. The lever 45 is held up by a spring, while it is connected by a connecting rod to the valve 48, so that when the lever is pulled down, the fluid under pressure is admitted to the ramming cylinder 47, and when it is pulled up by the springs, the cylinder is allowed to exhaust. As in the construction previously described, the pattern drawing cylinder 16′ is always under pressure.

The piston 44 is milled at its upper part to receive a member 49 (Figure 13) mounted on the pivot 50. This member has two arms 51 and 52, and to the arm 51 is fixed a spring 53, the action of which is to tend to swing the member out of its position, while the other arm 52, which is substantially horizontal, when in its ascending motion, is arranged so as to come in contact with a stop 54 carried by the frame 30′, the height of which can be regulated at will.

For ramming, the flask is put above the sand frame and filled with sand, the lever 45 is grasped with both hands and pulled in such a way that the beam 46 is brought above the machine. The lever 45 is then lowered, and the pressure being admitted to the cylinder 47, the ramming plate sinks with flask 37′ and sand frame 33′, effecting by this motion the ramming of the sand. By means of the rods 35′, lowering motion is transmitted to the plate 18′ and piston 17′, but the disk 23′, piston 44 and plate 20′ which are supported by the rods 28′, remain in position. At a given time, at nearly the end of the ramming motion, the plate 18′ descends a little beneath the member 49 and the latter, under the influence of the spring 53, swings and gets out of its place within the piston. The attendant then allows the lever 45 to rise and the cylinder 47 is consequently put to exhaust. The ramming plate rises and also the piston 17, plate 18′, member 49, piston 44, disk 23′, by reason of the engagement of the lower end of the member 49 with the face of the plate 18′, plate 20′, together with the lifting rods, stools, stripping plate, cores, through rods 35′, plate 18′ and also sand frame 34′ and flask 37′. Just before the upward motion is finished, the arm 52 comes in contact with the stop 54 and the member 49 swings back, while the piston 44, being no longer supported by the member 49, falls down with the piston 17′ and all its equipment, stripping plate, lifting rods, stools, etc., which parts thus move automatically into a position convenient for a new ramming position.

Through the handling of lever 45 only, the operator secures the complete operation of the machine without the necessity of other manipulation, and consequently with a considerable saving of time; the ramming and pattern drawing are effected with very great rapidity, and the output of the machine is rendered a maximum. It will be obvious that in the machine described with reference to Figs. 1 to 8, the operation of the lever 24 could be automatically obtained also, so that the operation of the machine would be effected solely by the operation of the valve, if so desired.

The machine described can be used with hydraulic power, compressed air, etc., and in the case of compressed air there is no necessity to use oil brakes as is the practice in many of the machines now on the market.

Having thus described my invention and illustrated its use, what I claim as new and desire to secure by Letters Patent is the following:—

1. In combination in a sand molding machine, a pattern member, a sand frame mounted thereabove for vertical telescopic movement thereover, a flask carried upon the sand frame and adapted to move vertically therewith, a presser means above the flask for moving the flask and sand frame and the sand carried thereby downwardly, a stripping plate upon the pattern member, and means for raising the flask and stripping plate simultaneously.

2. In combination in a sand molding machine, a pattern member, a sand frame in telescopic relation with the pattern member and yieldingly held with its upper edge above the pattern member, a flask carried upon the sand frame, a presser means above the flask, a stripping plate upon the pattern member, and means whereby the stripping plate and flask are moved upwardly simultaneously after the pressing operation.

3. In combination in a sand molding machine, a pattern member, a sand frame yieldingly held with its upper edge above the pattern member, a stripping plate upon the pattern member, a flask carried upon the sand frame, a presser means above the flask, and means whereby the stripping plate is made to follow the mold when the presser means, flask and sand frame move upward after the pressing operation.

4. In combination in a sand molding machine, a pattern member, a sand frame lying with its upper edge above the pattern member, yielding means for normally moving the sand frame to such position and holding it there, a flask carried upon the sand frame, a presser means above the flask, a stripping plate upon the pattern plate, and means whereby the said yielding means engages the stripping plate to move it upwardly with the sand frame and flask as the presser means moves upward after the pressing operation.

5. In combination in a sand molding machine, a pattern member, a flask spaced away from the pattern member, a sand frame interposed between the edge of the flask and the edge of the pattern member, presser means whereby the flask and member are forced to approach each other, compressing the sand in the sand frame and flask and causing the sand frame to telescope over the pattern member, a stripping plate above the pattern member, and means for moving the flask and stripping plate simultaneously away from the pattern member.

6. In combination in a sand molding machine, a pattern member, a flask spaced away from the pattern member, a sand frame interposed between the edge of the flask and the edge of the pattern member, a stripping plate normally resting upon the pattern member, presser means whereby the flask and member are forced to approach each other, compressing the sand in the sand frame and flask and causing the sand frame to telescope over the pattern member, and yielding means for automatically bringing the pattern member and flask to their original positions and the stripping plate to a position above its original position after the pressing operation.

7. In combination in a sand molding machine, a frame, a pattern plate carried thereby, yielding power means beneath the pattern plate, a flask carried thereby and normally held above the pattern plate, a sand frame interposed between the lower edge of the flask and the pattern plate and in telescopic relation with such pattern plate, presser means above the flask for carrying the flask and sand frame downwardly and compressing the sand therein, a stripping plate above the pattern plate, and means whereby the stripping plate is automatically engaged with the yielding power means when the flask reaches its lower position so that on the upward movement of the flask, the stripping plate is moved therewith.

8. In combination in a sand molding machine, a frame, a pattern plate carried thereby, yielding power means beneath the pattern plate, a flask carried thereby and normally held above the pattern plate, a sand frame interposed between the lower edge of the flask and the pattern plate and in telescopic relation with such pattern plate, presser means above the flask for carrying the flask and sand frame downwardly and compressing the sand therein, a stripping plate above the pattern plate, and inter-engaging means between the yielding power means and the stripping plate whereby the stripping plate is moved upwardly with the flask as the said presser means moves upward.

In testimony whereof I have hereunto signed my name in the presence of the two subscribed witnesses.

EUGENE RONCERAY.

Witnesses:
H. C. COXE,
JULIEN EAVERNE.